United States Patent [19]
Decker

[11] Patent Number: 6,123,036
[45] Date of Patent: Sep. 26, 2000

[54] LIQUID MULCH METHOD AND APPARATUS FOR MANUFACTURING SODS

[76] Inventor: Henry F. Decker, 4751 Stover Rd., Ostrander, Ohio 43061

[21] Appl. No.: 09/152,672

[22] Filed: Sep. 14, 1998

Related U.S. Application Data

[62] Division of application No. 08/813,698, Mar. 7, 1997, Pat. No. 5,806,445.
[60] Provisional application No. 60/013,045, Mar. 8, 1996.

[51] Int. Cl.⁷ .................................................. A01C 19/00
[52] U.S. Cl. ................................ 111/200; 111/101; 47/56
[58] Field of Search ............................ 111/200, 52, 199, 111/100, 101, 102, 107; 47/56, 59

[56] References Cited

U.S. PATENT DOCUMENTS

| | | | |
|---|---|---|---|
| 3,903,816 | 9/1975 | Brem | 111/101 |
| 4,099,345 | 7/1978 | Loads | 47/56 |
| 4,716,679 | 1/1988 | Heard | 47/56 |
| 4,720,935 | 1/1988 | Rogers et al. | 47/56 |

*Primary Examiner*—Robert E. Pezzuto
*Attorney, Agent, or Firm*—Isaac Angres

[57] ABSTRACT

An innovative liquid mulch method for the production of thin, lightweight and fastly growing sod over an impervious surface such as plastic sheeting are provided. The apparatus of the invention includes, among other components, a transportable agitating tank and a trailing planter assembly that facilitates the liquid mulch method of manufacturing sods.

11 Claims, 1 Drawing Sheet

LIQUID MULCH METHOD AND APPARATUS FOR MANUFACTURING SODS

RELATED APPLICATIONS

This application is a divisional of parent application Ser. No. 08/813,698, now U.S. Pat. No. 5,806,445. The parent application is preceded by Document Disclosure No. 393997, filed Mar. 4, 1996, and by Provisional Patent Application No. 60/013045, filed Mar. 8, 1996, both of which are incorporated in the application by reference in their entirety. This application claims the benefit of the earlier filed provisional application and is filed pursuant to 35 U.S.C. 119(e).

TECHNICAL FIELD

This invention relates generally to sod production and in particular to an innovative method and apparatus for planting and producing sods over an impervious surface such as plastic sheeting on which a liquid mulch or "slurry" is evenly distributed by a special apparatus according to the present invention followed by the broadcasting of a suitable growing medium on top of the slurry layer.

BACKGROUND OF THE INVENTION

The concept of growing sods over plastic sheeting goes back, at least in the United States, to experiments conducted by Henry F. Decker at Ohio Wesleyan University starting in the late 1960's. The concept was first published in an April 1975 newspaper article in the Columbus (Ohio) Dispatch from which it was widely distributed around the U.S. and into several other countries by the Associated Press. A more extensive article also appeared in the June 1975 trade magazine "Weeds, Trees, and Turf" (now "Landscape Management"). Later phases of the research were supported by grants from the National Science Foundation.

In these early experiments it was shown that it was feasible to grow grass sods over a root impervious surface, typically plastic sheeting, using various contrived growing media in place of topsoil. There were several distinct advantages to growing sods in this manner: the primary rooting of the grasses could be used to knit the sod and could be maintained intact in the final product (unlike in conventional sodding where the primary rooting is cut off when the sod is harvested and then has to be regenerated when the sod is placed on its new site); topsoil can be replaced as the growing medium by a wide range of otherwise waste materials; the sod is typically lighter especially compared to mineral soil-grown sods; and since the primary rooting will be used to bind the sod, it can be grown and harvested much more quickly often in just a few weeks. As well, the systems worked out to "manufacture the sod" lend themselves to harvesting and handling the sod in big rolls, i.e., often four feet wide by seventy feet or more long (Decker U.S. Pat. Nos. 4,986,026 and 5,177,898.) A wide variety of materials were tested as growing media in the early Ohio Wesleyan experiments and were listed in a 1972 Document Disclosure (No. 012097) followed a year later by a patent application Ser. (No. 371,462). These materials included organic wastes such as digested or composted garbage, leaves, and sewage sludge; seed or fruit hulls; spent tea leaves; loose and compressed cellulose fibers; wood chips and bark; sawdust, peat, and manure of various kinds; ground corn cobs; various grades, densities, and thicknesses of plastic foams; and many kinds of mineral matter including sand in varying grades; calcined clay; diatomaceous earth; and the expanded micas such as perlite or vermiculite.

Later experiments included spent mushroom soil, straw, and composted sewage sludge, yard waste, and animal manures (Decker U.S. Pat. No. 4,986,026 and U.S. Pat. No. 5,177,898). Subsequent patents have been issued using rice hulls (Rogers et al. U.S. Pat. No. 4,720,935), mushroom soil (Walton U.S. Pat. No. 4,934,094), conifer bark (Chamoulaud U.S. Pat. No. 4,232,481), straw (Heard U.S. Pat. No. 4,716,679), sand (Egan U.S. Pat. No. 5,301,446), and others. Other methods of production over plastic include using various types of nettings, geotextiles, polypropylene covers, burlaps, and other fabrics all of which are useful in specialized cases. In particular, composted sewage sludge and composted yard waste or the two of them combined have proved to be very effective media: they are both plentiful, inexpensive, easy to handle, and rich in nutrients.

Despite the many apparent advantages of growing sods over plastic, there were several major problems that had to be solved before the innovative concept had any economic significance. These problems have been reviewed by Decker in U.S. Pat. No. 4,986,026 and U.S. Pat. No. 5,177,898. Probably the most difficult of these problems, especially to the east of the Rocky Mountain rain shadow, is that of severe thunderstorms which can quickly wipe clean a thin patina of growing medium placed unprotected on a smooth sheet of plastic. This common act of nature has made most patents in this genre, including the early ones by Goodall (G.B. 1,290, 338), Dawson (G.B. 1,455,133), Loads (U.S. Pat. No. 3,863, 388), Blackburn (U.S. Pat. No. 3,890,739), Schneider (U.S. Pat. No. 4,225,359), and others, impractical and uneconomical for large scale planting typical of U.S. sod production.

Solving the problem of thunderstorms figured prominently in the early history of soil-less sod technology. The Decker patents teach the use of various mulches to form mulch/media/matrixes some types of which are surprisingly resistant to laminar flow and hence to sheet erosion. In effect the mulch forms a continuum over the plastic into which the growing medium is infiltrated. If this "3M system " is carefully constructed even media as thin as ¼th to ⅜th inch can be stabilized in severe thunderstorms which is a significant improvement in the stability of soil-less sods. All of the early work on soil-less sods of which I am aware was done with seeded, largely cool season varieties of turfgrasses.

I first began experimenting extensively with warm season, vegetative material in Ohio in the summer of 1991 (Document Disclosures 294725 and 337067). Essentially, the seed in the mulch/medium/matrix was replaced with stolons or sprigs, and it was possible to produce high quality warm season sods in just a matter of a few weeks. Different types of mulches were also tested including wood shavings, cocoa shells, shredded cypress bark, and pine needles, and different growing media including composted yard mulch from Hilton Head, S.C., and crushed cocoa shells. In the fall of 1993, RapidTurf,Inc. of Rincon, Ga., hired me as a consultant to explore if any of the working principles from the "3M system" described above could be applied to the production and stabilization of greens quality sods grown over plastic in a sand medium. RapidTurf was having a common problem: the integrity of their growing medium, which was a thin patina of USGA spec sand over plastic into which they planted sprigs or stolons, was being destroyed by the heavy thunderstorms characteristic of the summer months in the southeastern United States. No provision had been made for this major drawback in the practice of the RapidTurf technique. Nor was this problem appreciated or solved in their recent U.S. patent to Egan, U.S. Pat. No. 5,301,446. Consequently, their process was essentially inoperable. They were losing too much of their crop to severe thunderstorms. It was in finding a solution to these problems for RapidTurf (as disclosed in Document Disclosures 342627, 363575, and 365091 and in Decker, U.S. Pat. No. 5,481,827) that led to the discovery described below of an entirely new method for planting and, simultaneously, for stabilizing grass sods grown over plastic sheeting.

OBJECTIVES OF THE PRESENT INVENTION

The invention presented below provides significant improvements over the general state of the prior art of soil-less sod production. It provides a method and apparatus for manufacturing an improved turf product over impervious surfaces without excessive costs.

It is a further object of the present invention to provide an improved turf product which, prior to harvesting, is resistant to disruption caused by the force of thunderstorms, and which can be easily transplanted and installed and still maintain its integrity.

It is a further object of the present invention to provide a turf product which is durable and which can withstand long shipments, and which can be used on golf greens and athletic fields under relevant associated standards and guidelines. The significant advantages of these and other objectives of the present invention will become apparent from the following disclosure, the drawing of the various embodiments, the description of the preferred embodiments, and from the appended claims.

SUMMARY OF THE INVENTION

An innovative method and apparatus for the planting of sod over an impervious surface such as plastic sheeting is provided as follows. Seed, sprigs, stolons, milled turf pieces (i.e., sod that has been hammermilled), or combinations of these are mixed in water in a storage container having agitating means (such as a FINN® hydromulcher) with wood or paper fiber, peat, or other fibrous material that acts as a mulch to form a liquid slurry of the appropriate density. Optional additives may be included in the slurry in various proportions to enhance the effectiveness and the stability of the slurry once it is on the plastic. Such additives include, for example, lime, fertilizers, growth hormones, cellulose digesting bacteria, absorbents, cross fibers, and various tacks such as guar gum, and calcium sulfate (gypsum). The container having agitating means, hereinafter referred to as the "agitating tank", is mounted on a mobile transporting means, such as a truck or trailer bed, so that it can advance in a forward direction over the support surface to be planted. The slurry is then sprayed or discharged from the agitating tank through a flexible pipe at the end of which is at least one spray nozzle. The slurry is discharged through the nozzle onto a splash board that is a part of a trailing planter assembly (hereinafter referred to as the "TPA".) The TPA in one embodiment is linked through suitable frame means to the mobile transporting means for the agitating tank, so that the agitating tank and TPA can move as a unitary planting assembly over the rows to be planted. The TPA can also be equipped with a conventional hydraulic mechanism for lifting the TPA off the ground in order to facilitate the movement of the planting assembly to and from the planting site and when the machine is making a turn to a position to begin a new row. Each row to be planted is approximately eight (8) feet wide.

The splash board is approximately the width of the plastic roll(s). One or more rolls of rolled plastic sheeting is unrolled underneath the splash board onto a graded support surface, e.g., a soil field, as the agitating tank and TPA travel forward over the planting surface. The heavy plastic rolls can be positioned in the TPA by a fork lift. When it is advantageous to dispense two plastic sheetings on the support surface, the first and second plastic sheetings are each dispensed through a dispensing mechanism that enables the sheets to completely overlay each other. Whether one or two sheets are employed, the plastic sheeting is smoothed into place on the soil by a hollow pinch roller. In one alternate embodiment, the pinch roller can be preceded by an upstream (relative to the direction of TPA travel) heavier roller that flattens the surface of the support surface behind the flotation tires of the mobile transporting means. As a further embodiment, a small rake and/or small plow arrangement can also be inserted in a position upstream from the heavier roller to provide additional grading or smoothing of tire indentations in the support surface.

Once the slurry has been sprayed and stabilized on the plastic sheeting, it can be covered with any number of suitable growing media, such as, for example, USGA spec sand, composted yard mulch or sewage sludge, combinations of these, and other growing media recognized in the art as being suitable for sod production. An effective method here is to spin these media over the slurry using a spin spreader such as a Stoltzfus 56i which can also be rigged to side spin so that one does not have to track over a wet slurry.

The present method can be used to produce all types of sods in often just a matter of a few weeks. For example, bentgrass, tall fescue, bermudagrass, bluegrass, and other grass-types suitable for sod are within the purview of the invention. Also, some dicot sods, such as, for example, those from either seeds or vegetative propagation material. The sod produced in accordance with the invention can be harvested in large rolls of approximately four or more feet wide and two or more feet in diameter. The technique of the present invention makes it possible to maintain a thin sod, often as thin as one-fourth (¼) inch. The root system, of course, since it has been trapped by plastic from entering the underlying soil, can be harvested intact, which allows the sod to root much more quickly on its new site.

DETAILED DESCRIPTION AND PREFERRED EMBODIMENTS OF THE INVENTION

Figure 1:
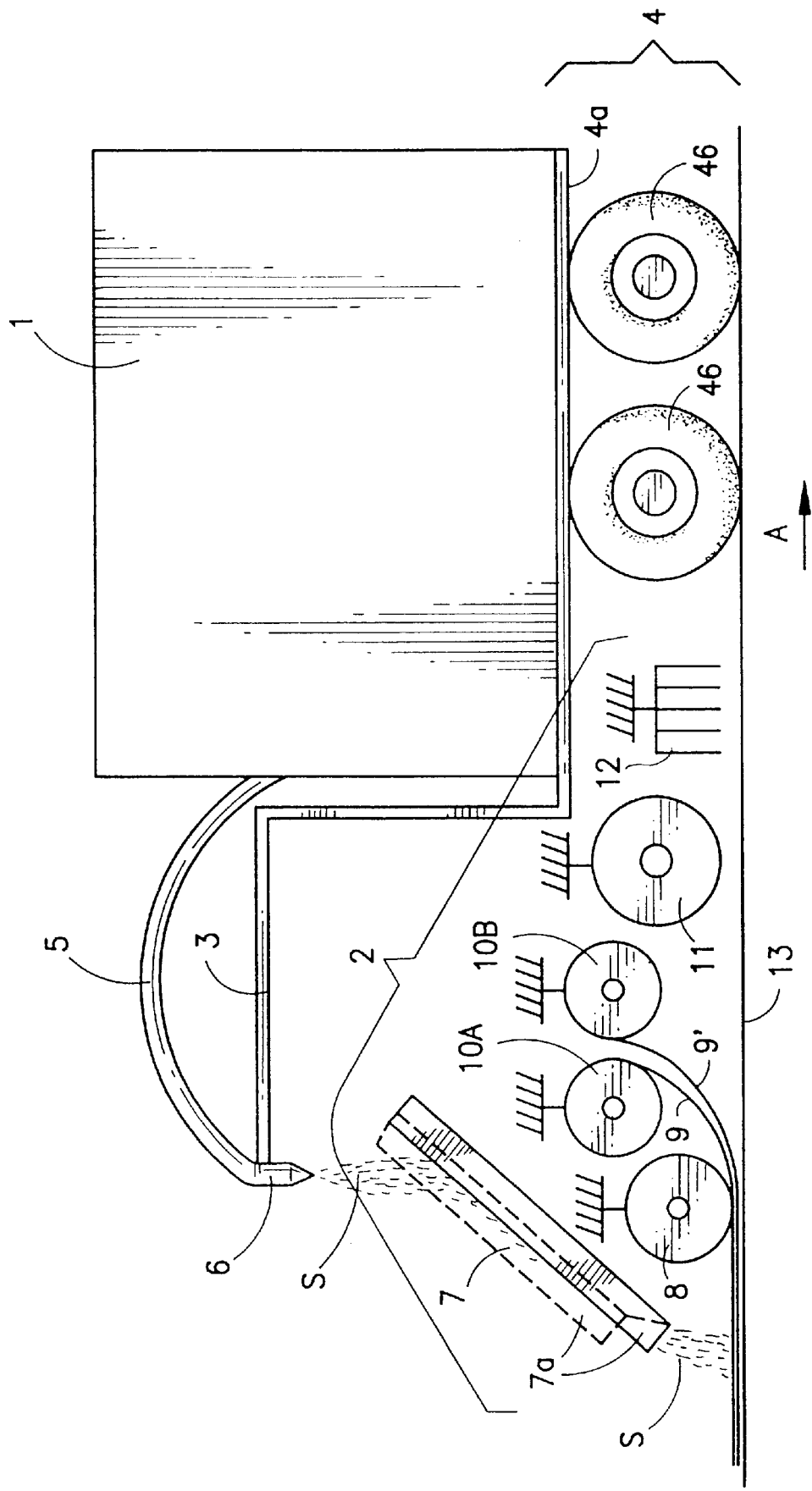
FIG. 1 is a side view of the planting assembly of the invention comprising an agitating tank (1) and a trailing planter assembly (2) for liquid mulch manufacturing of sods.

Referring now to FIG. 1 a more detailed description of the invention and of the preferred embodiments of the invention are provided.

FIG. 1 is a side view representation of a planting assembly according to the invention comprising a container have agitating means, hereinafter referred to as "agitating tank" (1), and trailing planter assembly, TPA (2). The prototype planting assembly comprises an agitating tank (1) and TPA (2) that are linked through suitable frame means (3) so that tank (1) and TPA (2) can be moved, via mobile transporting means (4), as a single unit. Examples of mobile transporting means include, but are not limited to, a trailer which is pulled by a separate towing tractor or a truck bed. Agitating tank (1) is carried on the mobile transporting means (4). The frame means (3) also provides points of attachment for each of the functional components of the TPA (2). In one of its simpler embodiments, the TPA (2) includes a splash board (7), a pinch roller (8), a sheet (9) of substantially root-impervious material, and a dispensing roller (10A) for dispensing sheet (9), all of which are to be described in further detail below. In another embodiment, the TPA incorporates, in addition to the components of the previously-described embodiment, a second dispensing roller (10B) that dispenses a second sheet (9') of substantially root-impervious material. To either of the two TPA embodiments just described, can be further added a smoothing roller (11), optionally in combination with a raking implement (12).

"Frame means" in accordance with the present invention are not particularized, but rather can be any of numerous frame configurations as envisioned by a manufacturer of farming equipment, so long as the configuration is compatible with carrying out the present objectives. It is preferable that the frame means (3) include a lifting means (not shown) to facilitate the movement of the planting apparatus to and from the planting site, and/or when the entire planting assembly is making a turn to a position to begin a new row. More particularly, lifting means, such as a simple hydraulic mechanism, enable the operator to adjust the angle of the splash board by moving the TPA (2) up and down, or shift the TPA (2) a few inches left or right in order to efficiently line up the plastic sheeting on a new row with the plastic sheeting(s) dispensed on the previous row. Also, lifting means also enable the vertical movement of the TPA (2) in order to adjust the angle of the splash board (7) and its open drop edge relative to the support surface (13) can be adjusted through the lifting means.

Selected propagating materials such as sprigs, seed, stolons, milled turf pieces, or combinations of these, are mixed with water into a carefully constructed liquid slurry or mulch which is kept suspended in water in the agitating tank (1). It takes approximately from four to six thousand gallons of the slurry mix to plant one acre. After it is fully mixed in the agitating tank (1), the liquid slurry (S) is pumped and discharged from the agitating tank (1) through a flexible pipe (5) that terminates into a spray nozzle (6). Spray nozzle (6) sprays the liquid slurry of plant propagating material onto a splash board (7) that is part of the TPA (2). As the agitating tank (1) and TPA (2) forwardly advance across the planting area (this movement is depicted as "A" in FIG. 1), the TPA dispenses the liquid slurry (S) via splash board (7) onto plastic sheeting (9) which is also dispensed by the TPA onto the support surface (13).

With further reference to FIG. 1, the splash board (7) of the TPA (2) is approximately the width of the plastic sheeting (9 and/or 9'), less four inches for overlap. The splash board (7) is connected to the frame means (3) through suitable connecting means (not shown). Suitable connecting means for the splash board (7) are not particularized, but for the requirement that it enables the splash board to be vertically, laterally, and/or inclinedly adjustable at various times during TPA operation and nonoperation. When the TPA is operational, e.g., forwardly advancing across an 8 foot wide row to be planted, the splash board (7) is downwardly inclined, extending downward towards the trailing end of the TPA (2) so that the action of gravity causes the liquid slurry (S) to drop off an open edge of the splash board (7) and onto the plastic sheeting (9). Preferably, the splash board (7) is designed to have a rectangular or square, flat receiving face bounded on three of its four edges by three sidewalls (7a), two of which are laterally opposed and the third of which is across the top edge. Preferably, the sidewalls are approximately 4 inches high. The purpose of the sidewalls is to contain the slurry from the time it impinges on the receiving face until it drops off the open bottom edge of the splash board (7). The liquid slurry (S) is dispersed evenly on top of the unrolling plastic sheeting (9) in a substantially thin, even, sheet-like veneer.

Plastic sheeting rolls (10A and 10B) are mounted into the TPA (2) through suitable holding means (not shown), such as, for example, a cradle or a spindle. Since plastic sheeting rolls (10A and 10B) are heavy and large, they are loaded by fork lift into a position in the TPA (2) that is just above the pinch roller (8). For an 8 foot wide splash board, the plastic rolls (10A and 10B) are custom-manufactured at 8 feet 4 inches wide to allow for a 4" overlap of the plastic sheeting when the next, adjacent, row is planted. Preferably, the plastic sheeting used is typically 1–6 mils in thickness depending on the soil type onto which the plastic sheeting is unrolled and the particular turf being grown. Also, depending on drainage conditions of the soil, the plastic sheeting can be perforated with "pinholes" so that excess water will drain down into the soil under the plastic sheeting. Such perforated sheeting would be dispensed from the TPA (2), for example, when practicing the invention on a sandy soil characteristic of the U.S. Coastal Plain, the internal drainage is much greater than that of an upland, heavy clay soil. More preferably, there are two rolls (10A and 10B) of simultaneously unrolling plastic, one unrolling clockwise, and the other counter-clockwise. In one embodiment, two sheets of 1–2 mil plastic with pinholes having as much as ¼" diameter, are simultaneously unrolled over the graded support surface (13) Plastic sheeting rolls (10A and 10B) are configured relative to each other such that the sheeting (9') unrolling from roller 10B will be interposed between sheeting (9), unrolling from roller 10A, and the support surface (13).

A light pinch roller (8) is disposed downstream of plastic sheeting rolls (10A and 10B) towards the trailing end of the TPA (2) and is upstream of the splash board (7). Pinch roller (8) is connected to the frame means (3) through suitable connecting means and makes pressing contact with the plastic sheetings (9 and 9') unrolling onto the graded support surface (13). The purpose of light pinch roller (8) is to smooth out the plastic sheeting so that it is ready to accept the slurry as it is discharged from the spray nozzle (6) and drops off of the splash board (7).

A heavy roller (11) alone or in combination with a raking device (12) situated upstream of roller (11) are further embodiments of the TPA (2). As with the other components of the TPA, roller (11) and raking device (12) are connected to the frame means through suitable connecting means. As shown in FIG. 1, roller (11) or roller (1) and raking device (12) are immediately upstream of the rolls of plastic sheeting (10A and 10B) and the light pinch roller (8). Roller (11) and raking device (12) provide additional grading and smoothing out of any tracks or tire indents made in the graded support surface (13) by wheels (4b) on the mobile transporting means (4).

Once the slurry has been dispensed and stabilized on the unrolled plastic sheeting, any number of suitable growing media, such as composted yard mulch, composted sewage sludge, varying grades of sand, combinations of these materials, and many others as appreciated by the inventor in his earlier patents, can be evenly spread over the slurry to establish a very effective growing matrix. When such growing media are employed, this embodiment will use a Stoltzfus spin spreader (not shown) to deliver these growing materials evenly over the slurry. This type of spreader can be rigged to side spin so that the spreader is not required to track over a row of wet slurry. However, since in only a very short period the slurry stabilizes, equipment can be moved over the planted row with no damage to the integrity of the planting. The invention described above makes it possible to produce a consistently thin sod, often as thin as one-fourth inch, with an intact primary root system already to root and to grow quickly on its new site. Standard sod harvesting machinery is used to harvest the sod typically in large rolls often 4 or more feet wide and two or more feet in diameter.

The slurry or liquid mulch is an important feature of this invention in that its content and variations have a direct effect on the final turf product. In addition to the plant propagating material, the slurry is comprised of elements such as wood or paper fiber, recycled paper, peat, or other fibrous material suspended in water in the agitating tank to form a liquid mulch. Various amendments such as lime, fertilizers, especially a phosphorus starting fertilizer, growth hormones, and cellulose digesting bacteria, if necessary, can be added to the basic slurry to enhance its effectiveness. Other amendments or ingredients can be added to the slurry to enhance its stability once it is spread on the impervious surface. These include synthetic cross fibers, absorbents, other wetting agents, various organic glues and tackifiers such as guar and other vegetable gums, and calcium sulfate (gypsum plaster). It is important to use primarily biodegradable materials in order for the end product to meet certain specifications, such as USGA greens specifications.

A typical 1000 gallon batch of a slurry mulch for propagating seeds would comprise the following:

| | | |
|---|---|---|
| seed | 25 | pounds |
| synthetic cross fibers | 10 | pounds |
| wood/paper mulch | 360 | pounds |
| gypsum plaster | 50 | pounds |
| lime | 80 | pounds |
| phosphorus fertilizer | 25 | pounds |

A typical 1000 gallon mixture for sprigs or other vegetative propagating material would comprise the following:

| | | |
|---|---|---|
| sprigs | 70 | Bushels |
| synthetic cross fibers | 10 | pounds |
| wood/paper mulch | 300 | pounds |
| gypsum plaster | 50 | pounds |
| lime | 80 | pounds |
| phosphorus fertilizer | 23 | pounds |

ALTERNATIVE EMBODIMENTS

The invention described above can be used to produce all types of sods often in just a few weeks. Examples include bermudagrass, bentgrass, bluegrass, tall fescue, or any type of grass sod. It is contemplated further still that even some dicot sods, from either seeds or vegetative propagating materials, can be produced according to the present method and apparatus. Many other ingredients can be spread onto the slurry at various points in time during the sod production, for example, immediately after the planting (i.e., dispensing slurry to the plastic sheeting), before or after application of a growing medium or in place thereof, or applied later throughout the grow-in cycle. Such materials include various grades of sand, peat, Milorganite, various chelates, humic acid, cellulose digesting bacteria, various combinations of micro and macro-nutrients, growth hormones, and numerous other organic excipients. It should be understood that the slurry essentially constitutes a moisture-retaining plant bed to which many auxiliaries can be added to optimize germination and plant growth. This innovative liquid mulch method of manufacturing sod, in which a selected growing medium is placed on top of a specific mulch layer, is an effective improvement on the mulch/medium/matrix concept which has been described in earlier Decker U.S. patents.

As noted above, a suitable growing medium can be broadcast on top of the previously placed slurry layer by a separate broadcasting vehicle (not shown in the Figure). It should be understood that the present invention also contemplates incorporating a growing medium spreader into the planting apparatus. It is further contemplated that the planting assembly according to the invention can dispense the slurry in directions other than from the trailing end of the TPA, so long as such dispensing is onto substantially root-impervious sheeting. It is also contemplated that practice of the invention in upland, heavier, poorly drained soils, can be executed using single sheets of heavier plastic without holes.

While this invention has been described in specific detail with reference to the disclosed embodiments, it will be understood that many variations and modifications may be effected within the spirit and scope of the invention as described in the following appended claims.

What is claimed is:

1. A method for providing a turf product, comprising the steps of:

a) disposing at least one sheet of impervious sheeting on top of a supporting surface;

b) disposing on top of the impervious sheeting a slurry layer comprised of water, plant fibers, plant propagating material, plant nutrients, and stabilizing materials;

c) broadcasting on top of said slurry layer a growing medium, wherein said growing medium forms a continuum over said slurry layer disposed on top of said at least one sheet of impervious sheeting;

d) growing the turf product from the plant propagating material, plant nutrients, stabilizing materials and growing medium; and harvesting the turf product off of the impervious sheeting.

2. The method as claimed in claim 1, wherein said plant fibers in said slurry layer of step (b) comprise at least one of wood mulch, paper mulch, peat, and water-retentive fibrous plant materials that function as a mulch.

3. The method as claimed in claim 1, wherein the plant propagating material added in step "b" is a vegetative material comprising at least one of sprigs, stolons, and milled turf pieces.

4. The method as claimed in claim 1, wherein the plant propagating material added in step "b" is seed.

5. The method as claimed in claim 1, wherein the plant propagating material added in step "b" comprises a combination of seed and vegetative material.

6. The method as claimed in claim 1, wherein the plant nutrients added in step "b" comprise lime, micro- and macro-nutrients, growth hormones, and cellulose digesting bacteria.

7. The method as claimed in claim 1, wherein the stabilizing material added in step "b" comprises at least one of synthetic cross fibers, calcium sulfate (gypsum), a tackifying agent, and absorbent polymers.

8. The method as claimed in claim 7, wherein said tackifying agent comprises at least one of a guar gum, a vegetable gum, and a vegetable glue.

9. The method as claimed in claim 1, wherein the growing medium in step (c) comprises at least one of composted sewage sludge, composted yard waste, and sand.

10. The method as claimed in claim 1, wherein said step (b) comprises disposing on top of said impervious sheeting a slurry layer comprised of approximately 70 bushels of sprigs, 10 pounds of synthetic cross fibers, 300 pounds of wood/paper fibers, 50 pounds of gypsum, 80 pounds of lime, and 25 pounds of phosphorus.

11. The method as claimed in claim 1, wherein said step (b) comprises disposing on top of said impervious sheeting a slurry layer comprised of approximately 25 pounds of seed, 10 pounds of synthetic cross fibers, 360 pounds of wood/paper fibers, 50 pounds of gypsum, 80 pounds of lime, and 25 pounds of phosphorus.

* * * * *